May 2, 1967 G. HALLIDAY 3,317,333
METHOD AND APPARATUS FOR TENSIONING MATERIAL
Filed May 11, 1964 2 Sheets-Sheet 1
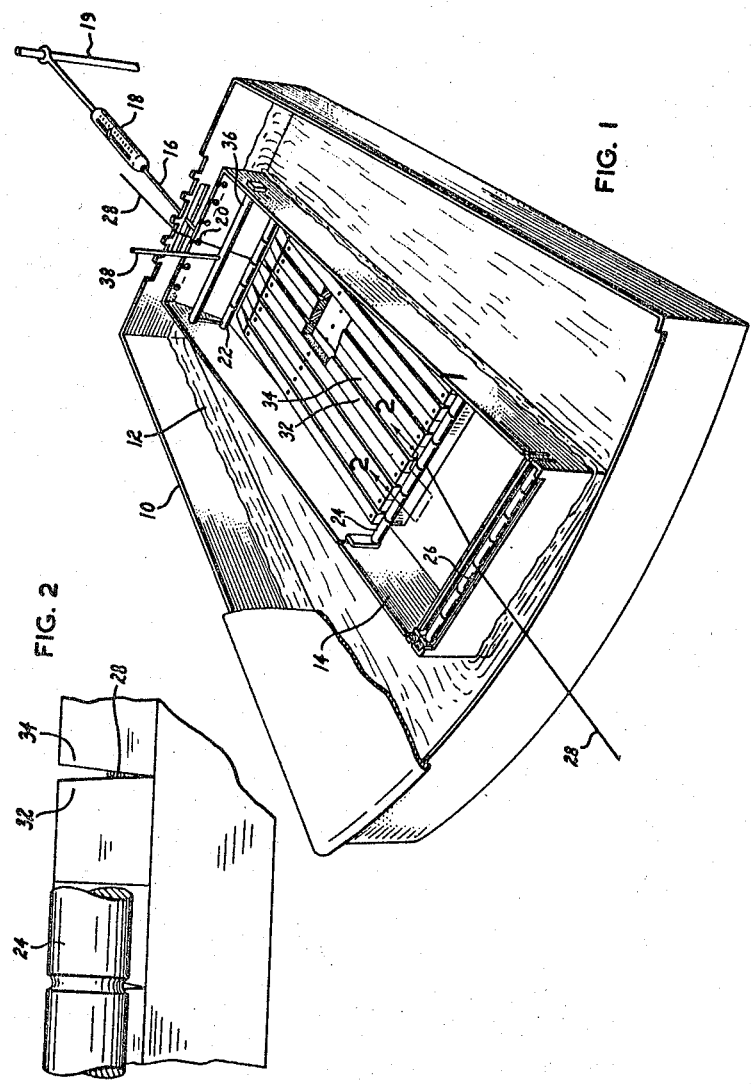
INVENTOR
GEORGE HALLIDAY
BY Christel & Bean
ATTORNEYS May 2, 1967
G. HALLIDAY
3,317,333
METHOD AND APPARATUS FOR TENSIONING MATERIAL
Filed May 11, 1964
2 Sheets-Sheet 2
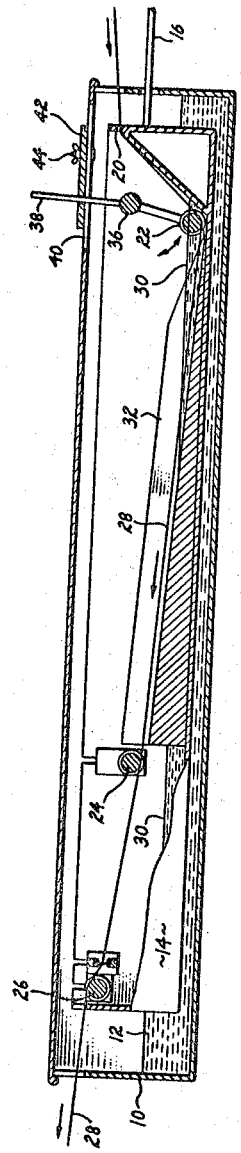
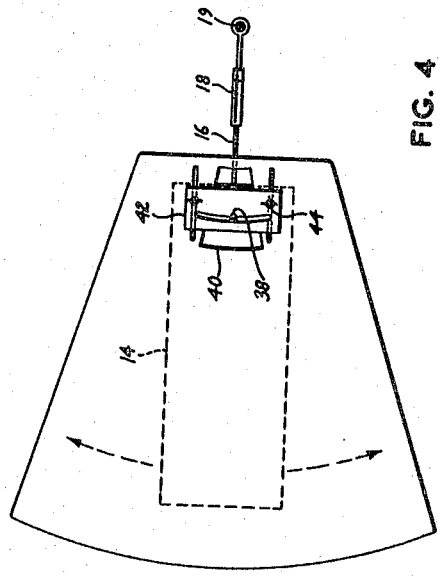
INVENTOR
GEORGE HALLIDAY
BY *Christel & Bean*
ATTORNEYS

United States Patent Office 3,317,333
Patented May 2, 1967

3,317,333
METHOD AND APPARATUS FOR TENSIONING MATERIAL
George Halliday, Toronto, Ontario, Canada, assignor to Philip D. Rosengarten, Montreal, Quebec, Canada
Filed May 11, 1964, Ser. No. 366,433
Claims priority, application Canada, May 15, 1963, 875,577
8 Claims. (Cl. 117—7)

This invention relates to apparatus for and a method of producing, indicating and controlling tension on an end of material as it is being processed, and has special application to the tensioning of strands, rovings, ribbons, etc., herein referred to generically as ends, in the filament-winding method of construction.

In the filament-winding method of fabricating reinforced plastic parts from glass fibres, the general method is to wet glass filaments with a resin, continuously wind them upon a mandrel of desired shape and then cure the resin. The ends must be tensioned as they are wound upon the mandrel and the maintaining of the tension within predetermined limits is very important in the obtaining of a high strength in the finished product. Complicated and costly tensioning devices are in existence. They have been useful in that they have done the job required. On the other hand, their deficiencies from the points of view of complication, cost and in some cases handling damage to the ends of material tensioned are well recognized by those in the art.

It is an object of this invention to provide a reliable method for tensioning an end of material as it is wound on a mandrel that is not unduly complicated and that can be manufactured at a relatively low cost.

This invention makes use of the resin with which the ends of fibre must be wetted before they are wound on the mandrel to apply tension to the end. According to the invention the resin that is entrained by the end as it is drawn through the resin bath prior to winding on the mandrel is brought into controlled slipping relation with a slip wall located in the resin bath to apply a predetermined amount of tension to the end as it is fed to the mandrel. Means are provided for adjusting the slipping relation between the resin entrained by the end as it moves through the bath and the slip wall means located in the bath to maintain the tension substantially constant. The invention will be clearly understood after reference to the following detailed specification read in conjunction with the drawings.

In the drawings:

FIGURE 1 is a perspective view partly broken away of a tension regulating device according to this invention.

FIGURE 2 is a view along the line 2—2 of FIGURE 1.

FIGURE 3 is a longitudinal cross section of the device of FIGURE 1 and

FIGURE 4 is a plan view of the device of FIGURE 1.

The embodiment of the invention shown in the drawings comprises a housing 10, having a liquid 12 such as glycerine therein, within which floats a slip vessel 14. An anchoring wire 16 attaches to the slip vessel and to a post 19 that is rigid with respect to the housing 10. Anchoring wire 16 has a spring type tension measuring scale 18 therein so that it can elongate and retract as the slip vessel moves within the housing, as will be described later.

The slip vessel is adapted to contain a liquid resin 30 and in use an end 28 of glass fibre or the like, is drawn from a supply package to a mandrel through the slip vessel, and in this respect guide means consisting essentially of eyelet 20, grooves in the bars 22, 24 and 26 are provided for guiding the end on its path through the slip vessel.

As the end passes through the slip vessel it becomes wetted with the resin as required in the filament winding process. At the same time it is tensioned in accordance with the requirements of the filament winding process, as will be described herein.

In the embodiment of the invention described in the drawings, tension is applied to the end 28 by the diverging face-to-face slip walls 32 and 34.

It will be noted that the guide means referred to above, guide the end of material between the slip walls 32 and 34. The speed of feed of the end 28 is such that as the end passes through the resin 30 in the slip vessel, a quantity of resin becomes entrained with the end. The entrained resin is in sliding relation with the slip walls 32 and 34, whereby the passage of the end is restrained and tension is applied to the end.

In the drawings only one end that consists of a plurality of individual fibres has been illustrated. It will be apparent and appreciated, however, that with the embodiment of the invention shown six ends can be simultaneously drawn through the slip vessel.

For a given speed of travel of an end 28 through the slip vessel the amount of tension applied to the end is a function of the proximity of the end to the slip walls 32 and 34. If the end 28 is relatively low between the diverging slip walls 32 and 34 and, therefore, close to the slip walls 32 and 34, there is a relatively high resistance to the passage of the end and, therefore, a relatively high tension on the end.

If, on the other hand, the end is relatively high between the diverging slip walls, it is a greater distance from them and the liquid entrained by the end does not encounter as much friction from the slip walls. As a result the tension on the end is less.

It will be apparent that tension on an end can be varied by raising or lowering the end between the diverging slip walls 32 and 34.

As indicated above, an important function of the device of this invention is to regulate tension on the end 28 as the pulling force thereon is varied. For example, if the speed and hence pulling force is increased with a consequent tendency to increase the tension on the end 28 due to the greater friction of the entrained resin and the slip walls this device operates to reduce the tension. This regulation of tension is effected by varying the slipping relation between the slip walls 32 and 34 and the resin entrained by an end of material travelling through the slip vessel 10.

It will be noted that the guide bar 22 is carried by the rotatably mounted shaft 36 so that rotation of the shaft 36 will vary the height of the guide bar within the resin bath 30. It will also be noted that it is the location of the guide bar 22 that controls the height of the end 28 between the slip walls 32 and 34. If, for example, the guide bar 22 is moved in a clockwise direction as viewed in FIGURE 3, the end 28 is raised between the slip walls 32 and 34.

An adjusting lever 38 extends upwardly from the shaft 36 through an opening 40 in the cover for the housing 14. An adjusting plate 42 carried by the cover for the housing provides a fulcrum for the lever 38 as the slip vessel 10 moves in use within the liquid 12 in the housing as will be explained later.

The location of the plate 42 longitudinally of the cover for the housing can be adjusted by means of set screws 44.

It will be apparent that if the slip vessel 10 is pulled forward in the direction of feed of the end 28 that the guide bar 22 will move in a clockwise and upward direction as lever 38 pivots about the fulcrum of the plate 42. Conversely, if the slip vessel moves rearwardly with respect to the housing the guide bar 22 will move counterclockwise and downwardly as the lever 38 turns about the plate 42.

The spring device 18 which permits the slip vessel to move with changes in pulling force of an end, the length of the lever 38 to its fulcrum point, the arc of travel of the guide bar 22, and the location of the fulcrum provided by the plate 42 are all designed to raise or lower the path of travel of an end between the slip surfaces 32 and 34 so that the tension applied to the end is substantially constant with variation in pulling force applied to the end.

As indicated above, this invention is primarily designed for the purpose of regulating, indicating and controlling tension on an end of glass filaments as it is wound on a mandrel. During the winding process, the speed of travel of the end, and hence pulling force, varies as the diameter of the mandrel upon which it is wound changes. With these changes in pulling force, there is a necessity for regulating the tension on the end to a substantially constant value as the speed of feed changes.

In the fabrication of reinforced plastic parts by the filament winding method the end must be wetted with a resin prior to winding which is subsequently cured. This invention, as indicated above, applies the resin and makes use of the resin entrained with the end as it passes through a resin bath to apply tension to the end.

In use the position of the plate 44 is adjusted on the cover of the housing of the unit to locate the guide bar 22 at an appropriate height in between the slip surfaces 32 and 34 to achieve the desired winding tension.

This tension can be read directly by reading the scale 18 in the securing wire 16 and in this connection it will be noted that it is not necessary to measure the winding tension by restricting the path of the end 28.

The end then is conducted from the package through the guide means of the apparatus described above to the mandrel and, as it passes through the resin bath 30, resin is entrained with the end.

The entrained resin is of a viscoisty such that it frictionally engages with the slip walls 32 and 34 to apply tension to the end as it is wound on a mandrel.

It will be apparent that the tension applied is to some extent a function of the viscosity of the resin. It has been found that a viscosity range between 2.5 and 200 poises at 25° centigrade is practical. Resins that are of a higher viscosity at room temperatures can be used by heating them to reduce their viscosity and in this connection it is possible to heat the resin bath by applying heat to the liquid 12 within which the slip vessel floats.

Suppose by way of example, that the plate 42 is adjusted to locate the guide bar 22 at a depth between the slip walls 32 and 34 to achieve the required tension on an end 28 as it is wound onto a mandrel. The end will be wetted and tensioned as explained above. The tension can be read directly from the spring scale 18.

As the diameter of the mandrel increases with the increased end wound thereon, the speed of the end will increase. The increased speed tends to increase the tension on the end and this has the effect of pulling the slip vessel forward against the tension of the spring scale 18. However, as the slip vessel moves forward guide bar 22 moves in a clockwise and upward direction due to the operation of the control lever 38 on the fulcrum plate 42, which is rigid with respect to the housing.

Forward and upward movement of the guide bar 22 raises the position of the end 28 a predetermined amount within the slip walls 32 and 34, whereby to reduce the tension on the travelling end 28 to the predetermined and originally set value. The slip walls, the travel of the slip vessel and the travel of the guide-bar 22 are proportioned to maintain the tension on an end substantially constant with variation in pulling force applied to the end. Thus the upward movement of the guide bar 22 is adapted to raise the end 28 sufficiently within the slip walls to increase the slipping relation between the liquid entrained and the slip surfaces in response to the increase in pulling force due to the increased rate of speed, whereby to maintain the tension constant. This invention has successfully controlled tension within one pound for variations in r.p.m. of the winding mandrel from 50 to 100.

The converse happens when the rate of feed of the end 28 decreases. In this instance the resilience of the spring scale 18 pulls the slip vessel 10 in a rearward direction to carry the guide 22 downwardly between the slip surfaces 32 and 34 to increase the tension on the end 28 until the tension again reaches the predetermined and set value.

The design of the slip surfaces is, of course, capable of variation. The principle of the invention is to use the friction developed between the walls and entrained resin as a means of providing tension for the end and means for varying the slip relation to regulate the tension.

It is of importance and it will be noted that there are no severe changes in direction of the end as it is processed through the tension applying device. Change of direction after wetting and while under tension can be held to a maximum of 5° until it is applied to the mandrel. This is important to minimize glass filament damage.

The design is capable of variation. By way of example, the design illustrated has diverging slip walls at an angle of about 3° and a length of about 23 inches. The slip vessel is about 13½ inches broad by 3 feet long, and a depth of about 4½ inches. The unit operates satisfactorily with a standard epoxy resin and curing agent in the slip vessel at a feed speed of between 10 to 300 feet per minute to achieve the desired scope of tension (.05 to .75 pound per end).

Embodiments of the invention other than the one illustrated will be apparent to those skilled in the art. The essence of the invention is the use of the friction between the entrained resin and a slip wall in the application of tension. This can be achieved in ways other than illustrated.

I claim:

1. A device for tensioning an end of material comprising a slip vessel adapted to contain a liquid in use, mounting means for said slip vessel, guide means for guiding an end of material through said slip vessel on a vessel path whereby to entrain a liquid contained in said slip vessel in use, slip wall means in said slip vessel adapted to be in a liquid in said slip vessel in use and adapted to be in slipping relation with liquid entrained by an end of material travelling said vessel path in use to tension said end of material.

2. A device for tensioning an end of material as claimed in claim 1 having tension adjusting means for varying the slipping relation between said slip wall means and liquid entrained by an end of material travelling said vessel path.

3. A device for tensioning an end of material as claimed in claim 1 in which said slip wall means comprises two slip walls in face-to-face diverging relation to each other.

4. A device for tensioning an end of material as claimed in claim 1 having tension adjusting means for varying the slipping relation between said slip wall means and liquid entrained by an end of material travelling said vessel path, said slip wall means comprising two slip walls in face-to-face diverging relation to each other.

5. A device as claimed in claim 2 in which said mounting means for said slip vessel is resilient and adapted to move with variations of the pulling force applied to an end of material guided through said slip vessel and in which said tension adjusting means includes means responsive to the movement of said slip vessel in its mounting for varying the slipping relation between said slip wall means and liquid entrained by an end of material travelling said vessel path.

6. A device as claimed in claim 2 in which said mounting means for said slip vessel is resilient and adapted to move with variations of the pulling force applied to an end of material guided through said slip vessel and in which said tension adjusting means includes means responsive to the movement of said slip vessel in its mounting for varying the slipping relation between said slip wall means and liquid entrained by an end of material travelling said vessel path, said slip wall means comprising two slip walls in face-to-face diverging relation to each other.

7. A method of tensioning an end of material as it is pulled from a package to a machine comprising the steps of providing a body of liquid having a viscosity that will become entrained with the end as the end is drawn therethrough at the feed velocity to the machine, providing a slip surface means in said liquid and tensioning said end by guiding said end on a path through said liquid with the liquid entrained by said end in slipping relation with said slip surface means.

8. A method of tensioning an end of material as claimed in claim 7 in which the tension on said end is regulated by increasing the slipping relation between the liquid entrained by said end and said slip surface means in response to an increase in pulling force on the end to increase tension and decreasing the slipping relation between the liquid entrained by said end and said slip surface means in response to a decrease in pulling force on the end to decrease tension.

No references cited.

ALFRED L. LEAVITT, *Primary Examiner.*

A. M. GRIMALDI, *Assistant Examiner.*